United States Patent [19]
Neel et al.

[11] Patent Number: 5,838,314
[45] Date of Patent: Nov. 17, 1998

[54] DIGITAL VIDEO SERVICES SYSTEM WITH OPTIONAL INTERACTIVE ADVERTISEMENT CAPABILITIES

[75] Inventors: Douglas E. Neel; Joel A. Pugh, both of Dallas, Tex.

[73] Assignee: Message Partners, Dallas, Tex.

[21] Appl. No.: 604,173

[22] Filed: Feb. 21, 1996

[51] Int. Cl.⁶ .................................................... H04N 7/167
[52] U.S. Cl. ................................ 345/327; 348/7; 348/10; 348/12; 455/4.1; 455/4.2; 455/5.1
[58] Field of Search .............................. 348/6, 7, 10, 12, 348/13; 455/3.1, 3.2, 4.1, 4.2, 5.1, 6.1; 345/327

[56] References Cited

U.S. PATENT DOCUMENTS

| | | | |
|---|---|---|---|
| 5,512,730 | 4/1996 | Lewis | 348/8 |
| 5,532,735 | 7/1996 | Blahut | 348/13 |
| 5,592,551 | 1/1997 | Lett et al. | 348/7 X |
| 5,610,653 | 3/1997 | Abecassi | 348/565 X |
| 5,938,426 | 6/1997 | Lewis | 348/8 X |

*Primary Examiner*—Nathan J. Flynn
*Attorney, Agent, or Firm*—Haynes and Boone, L.L.P.

[57] ABSTRACT

An interactive video services system for enabling store and forward distribution of digitized video programming is disclosed. In accordance with a feature of the present invention, encoded and compressed digital video signals are transmitted via satellite link from a centrally located uplink site to a plurality of hospitality establishments, where the digitized video programming is stored in the memory of a video server computer or is transmitted "real-time" to the hospitality establishment's customers. The establishment either has its own downlink facilities or shares downlink facilities with other hospitality establishments. The uplink facility and satellite can transmit a variety of video signals—including video signals for real-time viewing by customers, compressed video signals for storage and subsequent retrieval and viewing by customers, and other types of digitized data, such as advertisements and barker screens. Various signal types, including operating system updates and digitized menus and advertisement graphics for the video programming, are separated and appropriately processed and routed at the hospitality facility.

20 Claims, 4 Drawing Sheets

---

[SERVICE PROVIDER NAME] ON-DEMAND MOVIES

1. PRESS #1 ON YOUR REMOTE CONTROL AND YOU WILL BE CHARGED $4.95 FOR THE MOVIE "LITTLE WOMEN"

2. PRESS #9 ON YOUR REMOTE CONTROL AND YOU WILL BE SHOWN A FIFTEEN MINUTE INTERACTIVE ADVERTISEMENT; THE MOVIE "LITTLE WOMEN" IS FREE

Fig. 7a

[SERVICE PROVIDER NAME] ON-DEMAND MOVIES

1. PRESS #1 ON YOUR REMOTE CONTROL AND YOU WILL BE CHARGED $4.95 FOR THE MOVIE "LITTLE WOMEN"
2. PRESS #9 ON YOUR REMOTE CONTROL AND YOU WILL BE SHOWN A FIFTEEN MINUTE INTERACTIVE ADVERTISEMENT; THE MOVIE "LITTLE WOMEN" IS FREE

Fig. 7b

[SERVICE PROVIDER NAME] ON-DEMAND MOVIES

[SPONSER'S NAME] APPRECIATES YOUR TIME TO COMPLETE THE INTERACTIVE ADVERTISEMENT AND WILL PAY FOR YOUR MOVIE.

PLEASE PRESS #1 TO BE CONTACTED IN THE FUTURE BY [SPONSOR'S NAME] SO THAT YOU CAN LEARN MORE ABOUT [PRODUCT OR SERVICE NAME].

GET YOUR DRINKS AND POPCORN READY. YOUR MOVIE WILL START IN 30 SECONDS.

Fig. 7c

[SERVICE PROVIDER NAME] ON-DEMAND MOVIES

[ ] IS NOT AN APPROPRIATE RESPONSE TO THAT QUESTION

PLEASE PRESS #1 ON YOUR REMOTE CONTROL KEYPAD TO CONTINUE WITH THIS INTERACTIVE ADVERTISEMENT;

OR PRESS #3 TO RETURN TO THE MAIN MENU;
OR PRESS #9 TO HAVE A SERVICE REPRESENTATIVE CALL YOU.

DIGITAL VIDEO SERVICES SYSTEM WITH OPTIONAL INTERACTIVE ADVERTISEMENT CAPABILITIES

FIELD OF THE INVENTION

The invention relates generally to video services systems for use in hospitality establishments and, more specifically, to an interactive video services system for enabling interactive advertisements and advertiser pay-per-view and video-on-demand video programming.

BACKGROUND OF THE INVENTION

It is well known that hospitality establishments, herein defined as hotels, motels, hospitals, condominiums and the like, operate in a highly competitive environment. In order to attract customers and generate additional revenue, such hospitality establishments often offer a wide variety of services, including an assortment of video entertainment services. In addition to broadcast and cable television, hospitality establishments often have video services systems that offer pay-per-view and video-on-demand services, as well as a variety of interactive services.

In almost all cases, the hospitality video services system that provides pay-per-view and video-on-demand programming, as well as broadcast and cable television is owned and managed by a specialist company (e.g., SpectraVision, Inc. or On-Command Video) and not by the hospitality establishment. This specialist company typically delivers the cassette video tapes for the pay-per-view and video-on-demand services and maintains the video cassette players.

The pay-per-view video program service is a scheduled movie service that generally utilizes analog video cassette players installed at a remote location within the establishment. The cassette players are preloaded with selected video cassette tapes to be broadcast at predetermined, or scheduled, times. The programming can be accessed by multiple television sets (TVs) at any given time while the transmission is in progress.

The video-on-demand video services enables system users to select a program for viewing at their convenience. Viewing times are not prescheduled and customers are typically given a choice of a large number of video program alternatives (typically from eight (8) to fifty (50)). Typically, the selected program is transmitted in such a manner that only the customer that selected the video is able to receive the transmission. Alternatively, some video-on-demand systems provide "join-in-progress" capability, such that other customers also may view the selected programming. As with pay-per-view, the programming is stored on analog video cassette tapes. A video-on-demand system may include a robotic device that removes the video tape containing the selected programming from a storage rack and places it in one of several appropriate video cassette players. Alternatively, the system may include large numbers of individual video cassette players—one video cassette player for each video cassette tape. The customer's selection of a particular program activates only the video cassette player containing the desired programming.

The analog systems used to provide the services described above (see U.S. Pat. No. 4,947,244, to Fenwick et al) transmit standard, radio frequency signals to room televisions from traditional, mechanical video tape players and do not anticipate the integration of digital video servers or the reception of video programming from a centralized video source via transmission means. In addition, these systems do not permit customers to interact with video programming by inputting data for up-stream transmission and do not anticipate the integration of payment means, such as in-room magnetic card stripe readers.

With a recent advancement in the art, some video service providers are encoding and compressing digital video signals for subsequent transmission via satellite link from a centrally located uplink site to a plurality of hospitality establishments. At the hospitality establishments, the digitized video programming is stored in the memory of a video server computer or is transmitted "real-time" to the hospitality establishments' customers. The establishments either have their own downlink facilities or share downlink facilities with other hospitality establishments. The uplink facility and satellite can transmit a variety of video signals—including video signals for real-time viewing by customers, compressed video signals for storage and subsequent retrieval and viewing by customers, and other types of digitized data, such as data for advertisements, video schedules, and barker screens. These signals also can be transmitted to hospitality facilities by other means, such as broadband fiber optic links, but require the presence of expensive network facilities, including the broadband links and appropriate broadband switches. Various signal types, including operating system updates and digitized menus and advertisement graphics for the video programming, are separated and appropriately processed and routed at the hospitality establishment.

Methods of compressing and encoding digital video signals and delivering encoded and compressed digital video signals to a set top converter from a computerized video server via a communication means are well known in the art. The set top converter decodes and decompresses the signals and converts them to NTSC format for delivery to the TV. Methods of storing encoded and compressed digital video signals in a computer referred to as a "video server," as well as methods of transmitting data via satellite, are also well known in the art.

U.S. Pat. Nos. 5,133,079, 5,172,413 and 5,130,792 to Ballentyne, Bradley and Tindell, respectively, anticipate and explicitly teach the addition of a digital video server to the system. However, the systems taught by these patents require the addition of sophisticated switching systems, such as asynchronous transfer mode (ATM) switches, new broadband transmission networks, and set top units that can decode the transmissions.

Another patent requiring ATM switches and elaborate set top MPEG storage and decoding devices in U.S. Pat. No. 5,027,400, Baji. This patent discloses a viewer option where commercials normally viewed during broadcast programming can be moved to be viewed before or after the program. However, the Baji '400 patent does not contemplate payment alternatives and systems as described more fully below.

Despite the capability of the prior art video services systems, advancements in the art are needed for many reasons. As described above, the current hospitality video art only provides the same two classes of services that its transient customers already had available—(1) traditional broadcast television programming and video programming that are accessed by system users free of charge and (2) video programming, such as pay-per-view and video-on-demand, that require system users to pay a fee in order to access. It is desirable to offer video services, such as pay-per-view and video-on-demand services, wherein the users can choose, on a transaction by transaction basis, to have advertisers or other third parties pay for these services. Furthermore, it is desirable that a video system or network should be capable of collecting and storing interactive data provided by system users in response to product advertising. It is desirable that the video system or network be capable of contacting a live person or service representative in case the customer has problems with the interactive format or equipment, wants additional information, or wishes to purchase the advertised goods and services. Finally, it would be advantageous if the video system could determine the products most likely to be purchased by each individual user and select appropriate advertisements for that user.

Moreover, the residential pay-per-view and video-on-demand service offerings of cable television and telephone video dial tone companies also would benefit by offering pay-per-view and video-on-demand services optionally paid for by advertisers or other third parties. Current trials of video dial tone services by local exchange telephone companies have demonstrated the effectiveness of some video transmission technologies such as asynchronous transfer mode (ATM) switching. However, these same trials demonstrate the reticence of consumers to purchase enough pay-per-view and video-on-demand programming to pay for expensive new switching equipment and other network facility upgrades. In most instances, consumers used these new on-demand and pay-per-view video services only two to three times per month. This scant use of services will fail to reimburse service provider for expensive network upgrades. Clearly, interactive advertising, wherein the advertiser pays for the pay-per-view or video-on-demand programming selected by the consumer, would offer an alternative that would entice consumers to utilize pay-per-view services much more frequently.

SUMMARY OF THE INVENTION

In the preferred embodiment, the principle elements of the interactive video services system of the present invention include a systems control computer, a video server computer, a video distribution network, and a data base, all of which are located at the hospitality establishment. In this embodiment, the video signals for pay-per-view and video-on-demand programming are received by the hospitality establishment via a satellite link or broadband transmission links.

The systems control computer provides the logic support for the video services system, including the video server. The systems control computer is connected to a plurality of TVs located in customer rooms of the hospitality establishment. This computer receives programming requests from customers and transmits commands to the video server or some other video source. Similarly, the systems control computer is connected to a variety of on-premises and off-premises data bases, including the establishment's computerized property management system, and to a computer terminal at the establishment's front desk. The systems control computer stores and processes the billing data and other transaction information. In addition, the systems control computer is capable of generating graphic, audio, and video prompts. These prompts are displayed and/or broadcast on the in-room TVs and help explain to customers what services are available, clarify how to access and utilize various services, and assist customers in the selection of and payment for video programming. For these purposes, the systems control computer includes sound and graphics boards or is connected to a processor that contains sound and graphics capability.

The systems control computer is connected to the room terminals and TVs via a video distribution network comprised of coaxial cable and is used for the transmission of RF signals. In this embodiment, the systems control computer is connected to the video distribution network by graphics channels and via an intelligent RF modem. In an alternative embodiment, the video distribution network can be fiber optic, in which case signaling may be digital, rather than of RF.

Additionally, in the preferred embodiment, the systems control computer is connected to the video server by an Ethernet local area network (LAN). Alternatively, this connection between the systems control computer and the video server can be some other type of LAN, such as Token Ring, can be a direct digital link, such as a SCSI bus, or the two components could reside in the same unit. The systems control computer is capable of storing digitized audio, video and graphic data. This data can be transmitted to customers' rooms and broadcast on in-room TVs in the form of barker screens and advertisements, which may be transmitted from the systems control computer in place of standard broadcast advertising.

The systems control computer is also connected to at least one data base for storing data interactive advertisement data and other data received from system users. This data base can reside within the systems control computer or can be an external unit connected to the computer via the Ethernet LAN or via a direct digital link.

In a preferred embodiment, the video server is capable of storing a minimum of forty hours of video programs, or movies, for video-on-demand and pay-per-view viewing by an establishment's customers and is also capable of storing digitized advertisements. The video server receives encoded, compressed video program data that is stored on a hard disk array. Once a movie is selected, the associated video data is converted from a standard MPEG format, for example, MPEG 1, MPEG 2 or some derivative thereof, into an RF format and is transmitted to the appropriate in-room TV(s) via the establishment's MATV network.

In a particular room of the establishment, a customer utilizes a TV remote control unit, the room TV and the room terminal to access the video services system and order video-on-demand services. Typically, the customer will choose programming from a menu of choices presented on the TV screen. The customer inputs the selection utilizing the remote control unit or a keyboard on the room terminal. The room terminal functions as a modem and transmits the inputted data upstream to the systems control computer. In this fashion, users can also interact to control the video programming. Accordingly, customers can utilize video tape play-type commands (e.g., "pause," "fast forward," and "bookmark"), play video games, or, as new interactive multimedia products are developed, interact with the programming to an even greater degree. The room terminal also prevents unauthorized viewing of the programming.

In one aspect of the invention, the systems control computer, video server, and a data base accessible by the systems control computer are utilized to provide a service alternative to pay-per-view and video-on-demand video services. With this application, customers are given the option of paying for the pay-per-view or video-on-demand services with a credit or debit card or billing the transaction to their room bill as described above or having one or several advertisements transmitted in conjunction with the service and having the advertiser pay for the video programming. In a preferred embodiment, the system storing and transmitting the advertisements provides interactive capability. System users have the ability to respond interactively to questions and requests for data. For example, an advertisement for a particular manufacturer of automobiles can ask system users if they are currently interested in buying a new car, if they have a need for a mini-van, and if they prefer multiple air bags. The data accumulated from the interactive advertisement then is stored in the data base connected to the systems control computer that is accessible to the advertiser. The data could be used for developing and marketing products and for establishing sales leads. Because they actually interact with the advertisement, the system users are more likely to remember and utilize the advertisers' products. Moreover, the interactive advertisements also can be used to sell and take orders for the advertised products. The system as described herein also can provide the capability to collect, validate and store billing data entered by the system user. As described above, the systems control computer is connected to the property management system. From the property management system, the systems control computer is able to retrieve the name, home address, home telephone and room telephone number of the customer. The systems control computer can add this data to the other interactive data received from the customer, and give the advertiser the opportunity to pursue the qualified sales leads.

Finally, the data base and the software for the systems control computer enable the system to determine which particular advertisement to transmit to a given user. For example, the system can be configured so that a system user receives a different advertisement each time he or she selects to have the advertiser pay for a video-on-demand movie. The data base stores in the customer's file which advertisements previously have been viewed. Likewise, the system can control the type of advertisement that is selected for a given customer; e.g., the system will select and transmit advertisements for recreational vehicles to users who choose adventure video entertainment; customers who watch classic video entertainment will receive advertisements for luxury vehicles. In addition, customers can interact with the system and choose advertisements for the products that interest them.

A video service provider utilizing this invention may configure the system so that the customer could not access the free pay-per-view video programming unless all questions asked by the interactive advertisement were answered by the customer. The systems control computer monitors the answers by the customers and makes a determination that the customer has interacted with all the advertiser's questions by inputting answers.

With an alternative embodiment, the systems control computer can detect "time outs" or inappropriate data entries and conclude that the customer is having problems responding to the interactive advertisements and give that customer the option of interacting with a live service representative. Likewise, this embodiment enables customers to contact live service representatives in order to purchase products. After concluding that the customer is having a problem, or detecting a data entry that indicates the customer wants to interact with a live service provider, the systems control computer queries the property management system to determine the customer's name and telephone number. With a modem and a connection to the public telecommunications network, the systems control computer outdials the telephone number of a service representative. After connection to the service representative's computer system, the systems control computer down loads the customer's name and room telephone number. In addition, the systems control computer can down load the interactive data accumulated and stored in the data base in response to the interactive advertisement. With the down loaded information, a service representative can appropriately respond to the customer.

As an additional alternative, the systems control computer can access a data base with special instructions from the advertisers. For example, some advertisers may want system users to see their advertisements numerous times and will be willing to pay for several movies for any given user. However, other advertisers may choose only to pay for one movie per customer. The systems control computer utilizes the information when determining which advertisement to transmit to the customer. This data base can reside in several locations, including within the systems control computer or off-campus within a processor accessible to numerous control computers.

As a further alternative, the system described above can be altered for utilization within cable television networks and public telecommunications video dial tone networks for residential customers. A residential system consists of a controlling computer that is connected to one or more video servers and to at least two data bases—one for recording the interactive data and one for identifying the name, address and telephone number of the customer. The system also consists of a cable box or other modem unit that has the capability of transmitting signals upstream from the residence to the controlling computer. The modem unit enables the customer to order the video programming, choose to watch the advertisement instead of paying for the video programming, and interact with the advertisement. In addition, the control computer can be used to access data bases with records of advertisements or programs previously viewed by the customer, or of past purchasing transactions, in order to determine and select the most appropriate advertisement for the customer.

A technical advantage achieved with the invention is that a service can be provided wherein a customer can choose to have an advertiser pay for video services by receiving transmissions of designated advertisements.

A further technical advantage achieved with the invention is that interactive advertisements can be utilized to gather sales, marketing, and other data from customers.

A further technical advantage achieved with the invention is that the interactive advertisements can be used to complete sales transactions for goods and services and collect, store and validate the billing information provided by the customer.

A further technical advantage achieved with the invention is that advertisements can be selected and transmitted to a given customer based on that customer's program selection, interactive data input, and/or data base data reflecting the customer's past purchasing preferences.

A further technical advantage achieved with the invention is that customer data can be automatically forwarded, or forwarded at the customer's request, to service representatives who can then call and offer assistance to the customer.

A further technical advantage achieved with the invention is that special instructions from individual advertisers can be accessed and utilized for selecting advertisements to transmit to select consumers.

A further technical advantage achieved with the invention is that system elements can be installed in a cable television network or a telecommunications video dial tone network and interactive services and advertisements for pay-per-view and video-on-demand video programming can be offered to residential customers.

BRIEF DESCRIPTION OF THE DRAWINGS

FIGS. 7a–7c are sample interactive screens.

DETAILED DESCRIPTION OF THE INVENTION

Figure 1:
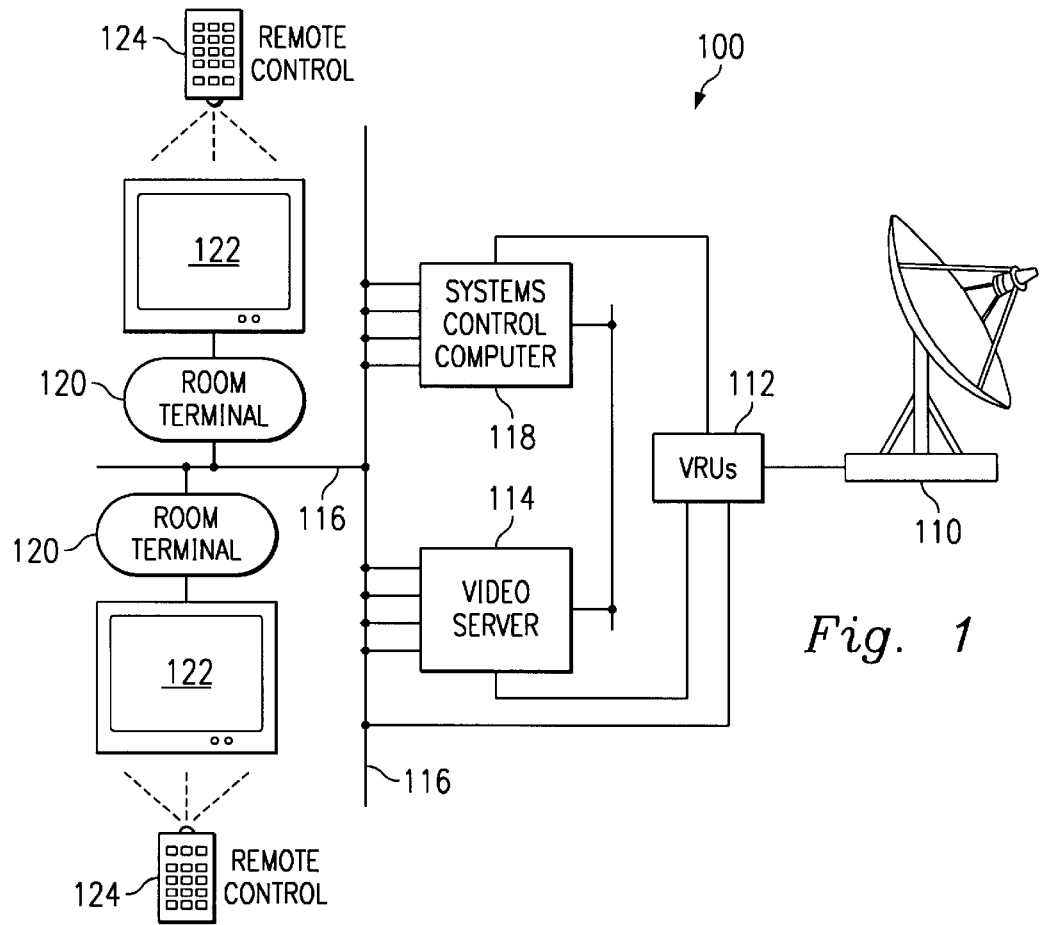
FIG. 1 is a block diagram of a video services system.

FIG. 1 is a block diagram that illustrates the video services system of a hospitality establishment. It should be understood that, in a typical arrangement, a video service provider will deliver video programming to a plurality of hospitality establishments, each with a video services system similar to FIG. 1. The system is designated as video services system 100. In FIG. 1, video program data transmitted via a satellite delivery network (not shown) is received by a downlink facility 110. The video data received by the down link facility 110 is then transmitted to a plurality of integrated receiver decoders (IRDs) represented in FIG. 1 by IRDs 112. The IRDs 112 determine the type of programming comprising the data, based on header information, the type of encoding scheme utilized for the data and/or the frequency range of the received video data. The IRDs then process and route the data based on these determinations. For example, if the received video data is encoded utilizing the MPEG-2 format, it is transmitted to a video server 114. If the video data is encoded utilizing a proprietary coding scheme, it is decoded, decompressed, and converted to RF signals by the IRDs 112 for transmission on a distribution network 116 as "real-time" video programming. If the data being processed by the IRDs 112 is for barker screens or audio/video advertisements or is non-video data (e.g., data for scheduling the transmission of advertisements or video programming), the data is transmitted to a systems control computer 118. Typically, the systems control computer 118 receives data such as operating system updates, on-screen movie menus, synopses of the video-on-demand programming, and advertisements graphics. Advertisements may also be stored in the video server 114. Likewise, if the data falls within a predetermined frequency range, it is determined to be a certain program for real-time transmission. Data within other predetermined frequency ranges are considered to be for other video programs.

Both the video server 114 and the systems control computer 118 are connected to a plurality of room terminals, represented by a room terminal 120, and a plurality of in-room TVs, represented by a TV 122, by the video distribution network 116. Typically, the network 116 is a radio frequency (RF) network, in which data is transmitted in a RF format to the room terminal 120 via the network 116. Data also can be transmitted via video distribution network 116 in a digital format, in which case it is advantageous to construct the network 116 using fiber optical cable.

Often, the video distribution network 116 is configured in a trunk/branch structure. In smaller establishments, numerous branches of coaxial cable connect to a single trunk, while larger hospitality establishments may have a plurality of trunks, each of which may be associated with a particular floor of the establishment, and each trunk associated with a plurality of branches. The plurality of trunks allows the systems control computer 118 to allocate a particular channel band width for use of transmitting more than one set of video program data. For example, channel 72 can be allocated for the transmission of a movie "A" on the trunk associated with the second floor of a hotel, while at the same time, the same channel bandwidth is allocated for the transmission of a movie "D" on the trunk associated with the third floor of the hotel.

The video distribution network 116 is connected to a plurality of room terminals represented by room terminals 120. Generally, in a hospitality facility, each of the guest rooms will have one room terminal 120 per a TV 122. The room terminal 120 interfaces with the systems control computer 118, the video server 114 and other video sources controlled by the computer 118 (not shown), and an in room TV 122. The room terminal 120 is usually a self-contained unit, but can also be a "smart tap" connected to the wall or can reside within the TV 122. The room terminal 120 can have keypad of two or more external keys or a full numerical keypad for use by the customer in selecting programming and changing television channels. Alternatively, the room terminal 120 may have no external keys, in which case the customer uses a remote control 124 and channel changer means of the TV 122 (not shown) to perform the aforementioned functions. The room terminal 120 is utilized to control reception of the broadcast television and special pay-per-view and video-on-demand programming. The room terminal 120 also controls use of interactive video services by providing a user interface to the systems control computer 118 and various system applications.

There are several methods by which the room terminal 120 can transmit data to the systems control computer 118. Some room terminals transmit data directly to the computer 118 immediately upon receipt thereof. Other room terminals temporarily store the data and transmit only after being polled by the computer 118.

The TV 122 and remote control unit 124 are preferably standard units. In the future, high definition TVs (HDTVs) may also be utilized. In addition, some TVs use unique protocols to communicate with the associated room terminals 120. As mentioned above, some TVs currently available include the functionality of the room terminal 120 internal to the TV 122. If such a TV 122 is being utilized within the hospitality establishment, a separate terminal 120 is unnecessary. Moreover, as will be shown and described with reference to FIG. 3, the room terminal 120 and/or the TV 122 may be connected to magnetic card reading devices that are capable of reading and transmitting credit and debit card information to the systems control computer 118 for validation.

In an illustrative operation of the video services system 100, data is received by the downlink facility 110 and transmitted to the IRDs 112. The IRDs 112 decode and decompress all "real-time" pay-per-view programming, i.e., programming to be immediately broadcast to customers at prescheduled times, and directly transmit such programming in an RF format to the video distribution network 116. It is anticipated that in a future embodiment, "real-time data" actually may be transmitted and received several times faster than real-time.

A customer responds to a menu displayed on the TV 122 that lists the video-on-demand programming stored in the video server 114 by using the remote control unit 124 to select items from the menu. Infrared signals generated by the remote control unit 124 are transmitted to the TV 122, which transmits the signals to the data processor 401 of the room terminal 120. These signals, along with the unique address of the room terminal 120, are transmitted to the systems control computer 118. The systems control computer 118 processes the request and issues commands to the video server 114 via the Ethernet LAN 208. The systems control computer 118 also transmits commands to the room terminal 120 instructing the terminal's data processor 401 to tune the TV 122 to a specific channel frequency bandwidth, such as that represented by channel 15, to receive the programming. Alternatively, the computer 118 can transmit audio/video or graphics to the TV 122 that instruct the system user to tune the TV 122 to the appropriate channel. The systems control computer 118 processes billing information entered by the customer, if such billing information is entered using a card reader (see FIG. 5) or the remote control unit 124, or adds the charge for the service to the room bill by accessing the establishment's property management system 403 via an RS-232 serial link.

In addition, the systems control computer 118 transmits commands to the video server 114 and the room terminal 120 designating a channel frequency for transmitting the selected program.

Upon receipt of a particular command from the systems control computer 118, the video server 114 begins downloading the selected programming from the appropriate disk drives (not shown). In addition, the video server 114 converts the data from MPEG format to NTSC format. Finally, the video server 114 converts the digital data to RF signals. These RF signals are then transmitted to frequency modulators 201, which modulate the signals to the appropriate frequency channel.

For pay-for-view services, the systems control computer 118 monitors the room terminal 120, detects that the system user has accessed a pay-per-view program for a given period of time, records that the customer has chosen pay-per-view programming, and establishes a billing record.

Figure 2:
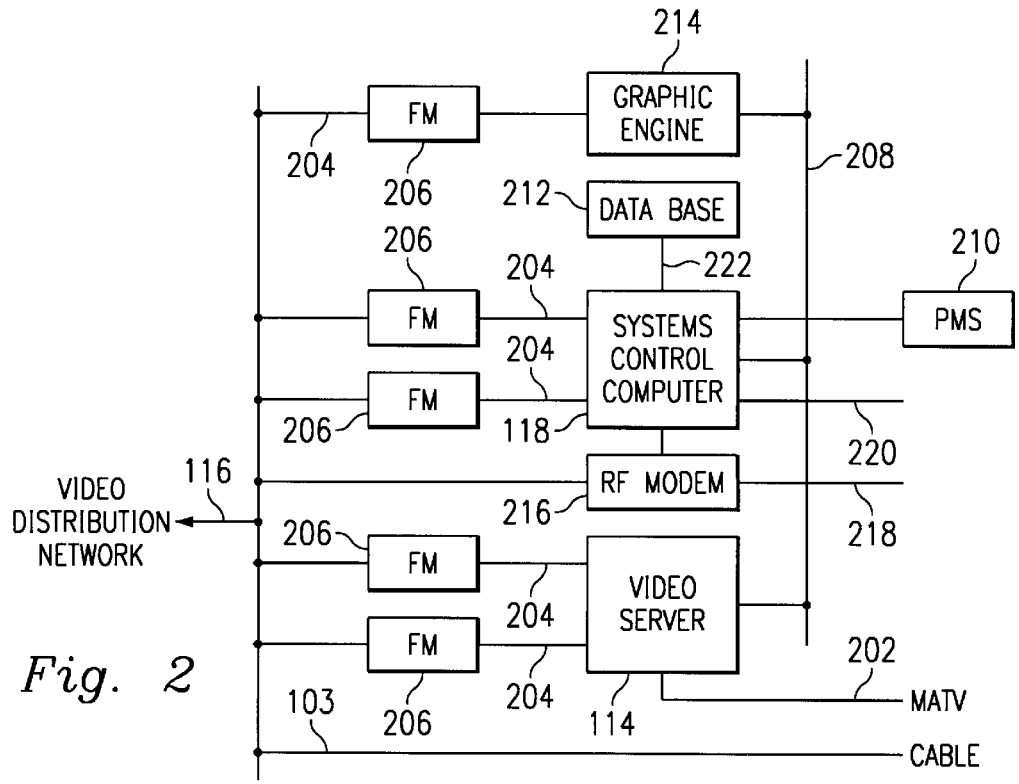
FIG. 2 is a detailed block diagram of the video services system of FIG. 1 embodying features of the present invention.

FIG. 2 is a detailed block diagram of video services system 100 illustrating how the video services system is utilized to provide interactive advertisements and alternative video-on-demand and pay-per-view services. In the FIG. 2, the IRDs 112 from FIG. 1 are connected to the video server 114 via data link 202. The video server 114 is primarily used to store encoded, digitized video programming for video-on-demand services. Although not shown, it should be understood that the video server 114 comprises a plurality of video disk drives in a video disk drive array, a video disk array controller, MPEG decoder circuit boards, and two processors, including a store-and-forward processor and a server processor. The video disk drives allow only read-only access by customers. During operation, the store-and-forward processor receives the downloaded video programming data files from the IRDs 112 via link 202. The store-and-forward processor reconstructs the video programming data files and insures file integrity. Once rebuilt, the files for the video program are forwarded to the server processor. The server processor transmits the data files to the video disk drive array. The store-and-forward processor also interfaces, via protocols, with the systems control computer 118. When the store-and-forward processor receives a command to transmit a movie, a command is issued to the server processor. The server processor commands the disk array to download data-files to the MPEG decoder circuit board. Once decoded, the program is transmitted to the video distribution network 116 via a plurality of analog video links 204. A frequency modulator 206 is utilized to modulate the signals to an appropriate television carrier frequency for tuning reception by the room terminal 120 or TV 122. In the preferred embodiment, the video server 114 is capable of switching any given programming to be output on any decoder channel. Alternatively, a video distribution switch (not shown) can be added to the system 100 between the video server 114 and the frequency modulators 201. Such a switch would function as a crosspoint switch and would allow the systems control computer 118 to allocate use of the links 100.

The read-only files that are stored on the video disk drive of the video server 114 can support multiple simultaneous accesses. Based on a customer command, the server processor directs the data corresponding to the selected video program to a MPEG decoder circuit board dedicated to a particular channel frequency. The MPEG decoder circuit board has buffer memory to store and forward the video data. The video data then is decoded and transmitted to the frequency modulator 206 via a link 204 wherein it is modulated and transmitted to the designated room terminal 120 and TV 122 via network 116.

In the preferred embodiment, the video server 114 is a modular configuration, with the initial module capable of storing forty (40) to one hundred (100) hours of programs, such as movies, depending on the length of the program, that are simultaneously accessible to thirty-two (32) system users. Additional modules would enable this video server 114 to store as many as 900 full length movies that are simultaneously accessible to hundreds of viewers. However, due to the transient nature of the hospitality market, it may not be necessary for a video server ever to store a library of more than twenty (20) to one hundred (100) full length video programs. Because of the architecture, the video server 114 constantly can be updated with recent popular programming, while older less popular programming is erased. All programs are available to all room terminals 120/TVs 122 connected to the system 100 at any time.

The video server 114 receives commands from the systems control computer 118, which instructs the server 114 regarding which programming to play, when to play the programming and which room terminals are to receive the programming. The video server determines the transmission channel and channel selection back to the systems control computer 118 via the Ethernet LAN 208. The video server 114 decodes video data comprising a selected movie using MPEG standards and transmits the decoded data utilizing radio frequencies.

The video server 114 also can store the video programming data for scheduled pay-per-view programming. At a scheduled time, the systems control computer 118 commands the video server 114 to transmit the selected program on a channel that can be accessed by all the hospitality establishment's customers. The systems control computer 118 monitors the room terminals in order to determine which customers access the programming and should be billed for the services. After the system user has viewed the programming for a given length of time, the computer 118 creates a file for the bill and transmits the bill data to the property management system (PMS) 210.

The systems control computer 118 provides logic support for the video server 114 and comprises a processor for data processing capability, hard drive storage for storing control and program algorithms, and read only memory (ROM) and random access memory (RAM). In one embodiment, the systems control computer 118 is a personal computer that utilizes an Intel 486 DX processor, 33 MHz with a 210 megabyte IDE hard disk and the SCO Lite UNIX Operating System, although it should be understood that a variety of other computer configurations can be utilized. In addition, the systems control computer 118 includes custom applications software, sound boards and multichannel graphics circuit boards. The computer 118 is capable of generating graphics screens, as well as video and/or audio prompts, to interact with customers.

The systems control computer 118 is connected to the room terminals 120 (FIG. 1), via the video distribution network 116. The computer 118 receives information from the room terminals 120, and utilizes the received information to provide video and other services for the customer. The systems control computer 118 is also connected, via RS-232 serial links, to the hospitality establishment's PMS 210, a printer (not shown), a front desk terminal (not shown). These connections allow the systems control computer 118 to integrate the video services system 100 with the hospitality establishment's billing system to provide a variety of customer and billing services. In addition, the computer 118 contains a 9600 baud or 14,400 baud modem (not shown). The modem enables remote access by the management company in order to download records and perform remote diagnosis of all system computers. It also allows the computer 118 to access remote data bases 212—if the data bases 212 are located off-premises—and service representatives for interactive advertisement services.

The systems control computer 118 is connected to the video server 114 and to one or multiple graphics engines 214 via the Ethernet LAN 208. LAN operating software resides within the computer 118. The systems control computer 118 communicates with the video server 114 with a proprietary protocol. The computer 118 receives commands for video-on-demand programming from the room terminal 120 (FIG. 1) and sends commands to the video server 114 to cause the server 114 to broadcast or "play" the selected program on a selected channel. In addition, the computer 118 monitors the video server 114 to determine which programs are available and which programs are being watched. The computer 118 performs diagnostics and status tests on all channels in the video server 114 system. Likewise, the video server 114 can store the data for pay-per-view programming, in which case, the systems control computer 118 must include scheduling instructions and a timing means such that at prescheduled times, the systems control computer 118 can transmit a command to the video server 114 regarding which programming to play and which room terminal 120 is to receive the programming.

The graphics engines 214 are utilized to distribute some audio, video and graphics applications and capability from the computer 118 to remote processors. The graphics engines comprise a processor (motherboard), graphics card, Ethernet card, and audio sound card, none of which are shown in the figure. The disk operating system and Windows applications for the graphics engines 214 reside in the systems control computer 118. The graphics engines 214 are utilized for generating audio/visual prompts, barker screens, and other advertisements and similar applications, which the systems control computer 118 can cause to be displayed on the TV 122 in place of broadcast advertising. The systems control computer 118 also can be connected, via the Ethernet LAN, to CD ROM units (not shown).

The systems control computer 118 is connected to an intelligent RF modem 216 via an RS-232 serial link. Alternatively, the modem 216 may be internal to the computer 118. The RF modem 216 is utilized to convert computer communications signals to the room terminals 120 from a digital format to RF signals. In the preferred embodiment, the RF modem 216 includes limited processing capability. Therefore, instead of utilizing the processing capability of the computer 118 to initiate communications to the room terminals 120 or the IRDs 112, the intelligent RF modem 216 polls, communicates, and receives data at its own initiative and then connects the appropriate terminals to the computer 118 only for status changes. The RF modem 216 also provides a command and status interface with the IRDs 112 via data link 218.

The systems control computer 118 is directly connected to the IRDs 112 via the RS-232 serial link 220. Data for scheduling and billing, as well as audio/visual data for advertisements, can be transmitted to the hospitality establishment via a satellite distribution network (not shown) or a land based communications network. This data is differentiated from other video data by the IRDs 112 and transmitted directly to the systems control computer 118 via link 220. If the data for advertisements is in the MPEG format, the system can be configured either so the data is transmitted to the systems control computer 118 via link 220 or the video server 114 via link 202.

The systems control computer 118 is connected to a data base 212 via data link 222. The data base 212 can reside in one of at least three locations. In many instances, especially in small and medium sized hospitality establishments, it is advantageous for the data base 212 to reside within the systems control computer 118. If internal to the computer 118, the link 222 is an internal bus within the computer 118. The data base 212 also can be an adjunct to the systems control computer 118 or a separate unit within the hospitality establishment, in much the same way that the property management system 210 is a separate unit that interfaces with the systems control computer 118. The data base 212 is connected to the systems control computer 118 via the link 222 which is a data link such as an RS-232 link. Alternatively, the data base 212 can reside outside the hospitality establishment and can be accessed by the systems control computer 118 via modem by one of several types of transmission means, including standard voice or data transmission links. If located off premises, the data base 212 is accessible by systems control computers from a plurality of hospitality establishments.

In some embodiments, the data base 212 actually is representative of multiple data bases. With these embodiments, each data base 212 can be positioned in any one of the various locations described in the preceding paragraph. Likewise, the type of transmission links 222 will vary according to the location of each data base 212.

The data base 212 fulfills multiple functions. For example, the data base 212 is used to store a record of which advertisements have been viewed by given customers. With this feature, the systems control computer 118 can determine which advertisements have been viewed on any given room TV 122. Also, the data base 212 is used to store the responses to any interactive advertisements that are transmitted to the room TVs 122. It is preferred that the responses of a given customer to a given interactive advertisement are stored in a file separate from the responses of other customers and other advertisements. The customer's name, address and other information can be added to the data base 212 file of interactive responses. After receiving the interactive data from a specific room TV 122, the Systems Control Computer 118 accesses the room file, for the same room, within the property management system 210 using established protocols. From that room file, the systems control computer 118 has access to information provided by the customer during check-in to the hospitality establishment—including the customer's name, address, work and home telephone number, and usually a bank card number and expiration date.

This information then can be copied by the systems control computer 118 into the data base 212 file. The file can be subsequently accessed by or provided to the advertiser.

In an alternative embodiment, wherein the customer can respond to an interactive advertisement by purchasing the product, the data base 212 is used to store billing and product sale information. For example, if the interactive advertisement is promoting clothing for a catalog company, the customer can input size, color and product identification information for the item of clothing being purchased. In addition, the customer can pay for the item of clothing by inputting bank card data or by allowing the advertiser to use the credit card number on file in the property management system 210.

The data base 212 also can be utilized to store product preference information about each of the hospitality establishment's customers. This information can be limited to video program data or can also include data on other services and products purchased at shops and restaurants within the hospitality establishment. In the preferred embodiment, the video purchase data is stored within the data base 212 and the customer check-in data is stored in the property management system 210 and then copied, as needed, to the data base 212 by the systems control computer 118. However, this data can be stored within the property management system 210, the data base 212, or within both units. Product preference data is used by the systems control computer 118 to determine which advertisements to transmit to a given customer. For example, if a given customer purchases video-on-demand adventure movies, the systems control computer 118 selects advertisements that have an adventure format or advertisements that promote products identified with adventure activities.

Furthermore, a data base 212 can be utilized to store special instructions from the advertisers. The special instructions can include commands designating the number of times a given advertiser is willing to purchase video entertainment for a given customer. For example, some advertisers may determine that it is advantageous for consumers to view their advertisements multiple times. The data base will include instructions for the systems control computer 118 that will enable the computer 118 to transmit a given advertisement to a given customer numerous times, thus causing the advertiser to purchase numerous movies for a given customer. In a similar fashion, other advertisers may decide that they wish only to purchase one video-on-demand movie per customer. The data base will include the appropriate instructions for the computer 118. As with the other data bases 212 described in the above paragraphs, this data base can reside in one or more of multiple locations, including within the systems control computer 118. It is preferable, however, that this data base 212 be located off-premises in a centralized location. In this manner, numerous control computers 118 can access the data. Likewise, the data base 212 can be used to determine which advertisements to transmit to a given consumer even as that consumer to and from several different hospitality establishments. Centralized placement of this data base will become even more important as this invention experiences more widespread implementation.

The system control computer 118 has the capability of determining whether a system user has correctly provided an interactive response. If the system user provides an inappropriate response, the systems control computer 118 generates and transmits a screen to the TV 122 identifying the mistake and requesting that the system user enter a correct response. If the user continues to enter inappropriate responses, the systems control computer 118 can utilize a modem connectable to the local public telephone network to contact a person at a service center or at the front desk of the hospitality establishment. As another alternative, the systems control computer 118 can generate screens that give system users the option to interact with a service representative instead of the computer 118. In either case, the systems control computer 118 transmits the system user's name and room telephone number to the service representative. The service representative then can call the system user and help that person with the responses or manually record the responses over the telephone. Additionally, the service representative may simply allow the user to view the programming without completing the interactive advertisement. For the last option, the service representative would have to call the systems control computer 118, and, once a connection is made with the computer 118 modem, generate signals (e.g., DTMF) according to an established protocol that would command the system to transmit the requested video programming to the appropriate room TV 122. Alternatively, the off campus service representative would manually call the front desk of the establishment and request that they transmit the requested video program to the appropriate room TV 122 at no cost. The capability of accessing a live service representative is especially helpful if the interactive advertisement is utilized to directly sell a product or service. The potential sale would be lost if the system did not have the capability of contacting a service representative when the customer became confused and responded incorrectly or when the software for the interactive advertisement failed for some reason to operate correctly. With this application, the service representative would take the order for the product or service and receive and process the billing information.

As previously indicated, the systems control computer 118 and the graphics engines 214 are connected to the video distribution network 116 by a plurality of links 204. Each link 204 is connected to a frequency modulator 206. The frequency modulator 206 is utilized to modulate the signals to an appropriate television carrier frequency for tuning reception by the room terminal 120 or TV 122. Alternatively, a video distribution switch (not shown) may be added to the system between the video server 114, systems control computer 118 and graphic engines 214 and the frequency modulators 201. As described previously, this switch would function as a crosspoint switch and the systems control computer 118 would control the switch to allocate the use of the channel frequencies.

In an exemplary illustration of the invention, the system 100 is capable of receiving advertisements, including interactive advertisements, and storing them either in the systems control computer 118, the graphic engine 214, or the video server 114. Incoming data is identified as advertising data by the format of the encoded signals or by header information and is forwarded to the appropriate storage facility by the IRDs 112. In addition, interactive graphic screens stored and generated by the systems control computer 118 are transmitted to the room TVs 122. These screens explain to the customer that, as an alternative to paying for a pay-per-view video program, the customer can choose to watch one or more commercials and the advertiser will pay for the pay-per-view video program. FIGS. 7a–c are examples of interactive screens that are used to offer advertiser video-on-demand and pay-per-view movies. These commercials can be of a certain duration and can be shown at a specific time before, during or after the transmission of the video program. However, with the preferred embodiment, the commercials are interactive and are presented on the TV 122 before the video program. Ideally, interactive commercials are a combination of audio, video and graphic screen content. The audio/video portion of the advertisement can be stored in the video server 114, the systems control computer 118, or in an adjunct unit, such as the graphic engine 214, that is connected to the computer 118. Transmission of audio/video data would be followed with graphic screens that allow system users to respond to questions. Transmission of subsequent audio/video content or graphic screens depends on the response given by the user and is controlled by an algorithm within the software of the computer 118. System users input responses with the remote control 124 keypad, or, if provided, a room unit keypad. Alternatively, interactive advertisements can be advanced interactive programs such as currently available for CD ROM interactive programming and games. Responses to advanced interactive programming typically would require a remote control 124 with mouse or "joy stick" functionality. Alternatively, a mouse, joy stick or some other interactive data input device (not shown) can be attached to the TV 122 or the room unit 120.

Interactive commercials provide several advantages that are not available with standard commercials. For example, it is believed that, if potential customers interacts with a commercial, they will more likely remember the brand name of the product and the content of the commercial. In addition, interactive commercials enable advertisers to collect data from potential customers. For example, an interactive commercial for a new automobile could ask potential customers to describe features and options they would prefer and what they would be willing to pay. This data could be utilized to better design or package a product or, if a customer responds that they are interested in purchasing the product, could be used to generate "sales leads" for the advertiser's sales force.

Likewise, for some products, the interactive screens and the system as described herein can actually be used to complete a sales transaction. As an example, a shop within the hotel provides an interactive advertisement to promote its skirts and blouses. The interactive screens allow customers to respond with the style, the size, and the color of clothing the desire to purchase. This data is saved in the data base 212 and accessed at a later time by the advertiser. Interactive screens then give the customer the option of paying for the clothing with a bank card or charging the purchase to the room account stored in the property management system 210. If the customer uses a bank card, the card number is entered with a remote control 124 key pad, a room terminal 120 key pad (some room units contain numerical key pads), or a card reader (see FIG. 3) connected to the room terminal 120. The systems control computer 118 can store the billing data to be subsequently retrieved or can utilize a modem to access the appropriate billing data base and validate that the card and transaction are valid.

Figure 3:
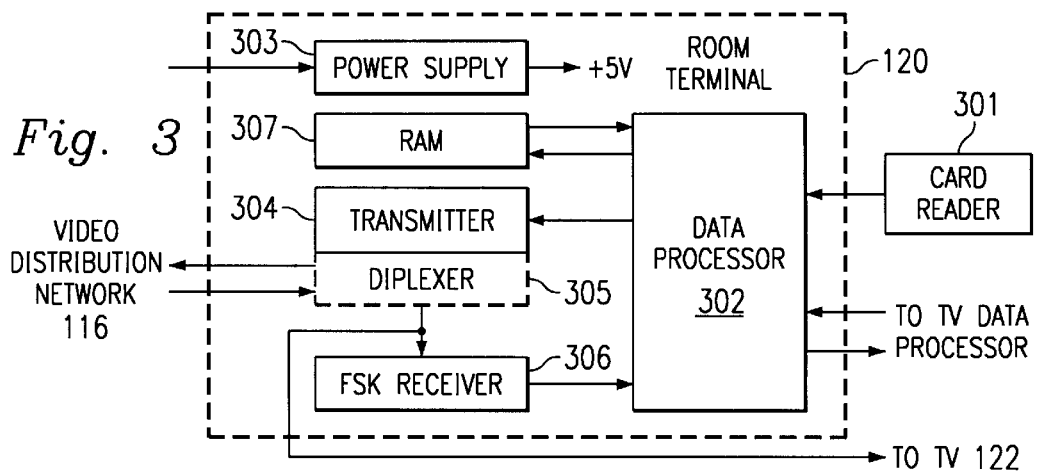
FIG. 3 is a detailed block diagram of a room terminal of the video services system of FIG. 1.

FIG. 3 is a functional block diagram of the room terminal 120 with an optional card reader 301. It should be understood that various functions and circuits of the room terminal 120 not directly related to the invention as disclosed herein are not shown or described herein. As previously indicated, many TVs now have internal data processors and infrared receivers and incorporate much of the same capability as room terminals manufactured as recently as five years ago. Because of the increased capability of the TV 122 and duplicated functionality, it has become common in the art for a video services system to utilize room terminals with decreased functionality, but including a data processor, such as the data processor 302, that is capable of interacting, via protocols, with the processor of a TV 122.

Data processor 302 is connected to a processor (not shown) of the TV 122 via an RJ 11-type interface (not shown). Four of the six wires of the RJ 11 interface, respectively, carry data from the processor 302 to the TV 122 processor, data from the TV 122 processor to the processor 302, infrared data from an infrared receiver (not shown) of the TV 122 to the processor 302, and clock information from the TV 122 to the processor 302.

The room terminal 120 includes a power supply 303, which outputs +5 volts for use by the circuits of the room terminal 120. Because of the low power requirements of the room terminal 120, it can receive power from a wall plug or from the TV 122. A transmitter 304 is utilized by the room terminal to transmit signals to the systems control computer 118. When the transmitter 304 receives data and the appropriate signal from a data processor 302, the resulting signal is output to the systems control computer 118 by means of a diplexer 305.

The diplexer 305 provides capability both to transmit and receive signals over the RF carrier network. Cable or broadcast television signals pass through the diplexer directly to the TV. Commands or other signals from the systems control computer 118 are directed by the diplexer 305 to a frequency shift key (FSK) receiver 306 and then to the data processor 302.

The data processor 302 receives inputs from and controls almost all circuits comprising the room terminal 120. Each room terminal 120 in the hospitality establishment has a unique identification number, or address, that is stored in the processor 302. The processor 302 must at least have adequate processing capability to process billing data received from the optional card reader 301 and commands received from the TV 122, including commands input by the customer with the remote control unit 124. Characteristically, this data is temporarily stored in a non-volatile random access memory (RAM) 307. Data is read from the RAM 307 and transmitted to the transmitter 304 when requested by the systems control computer 118 (i.e., when the room terminal 120 is polled by the computer 118). Alternatively, the data is read from the RAM 306 and transmitted by the transmitter 304 without being polled by the computer 118 if the communications is initiated by the room terminal 120.

As described above, the data processor 302 interacts with the TV's data processor. Among other functions, the data processor 302 and the systems control computer 118 manipulate the tuning of the TV 122 tuning for reception of video-on-demand programs and to prevent unauthorized access to programming. The systems control computer 118 transmits instructions to the data processor 302 instructing it to tune the TV 122 to a particular channel frequency bandwidth so the customer's selected video-on-demand programming can be viewed. This is an advancement over technology that required the systems control computer 118 to transmit instructions to customers using audio/video or graphic screens, instructing them to manually tune the TV to the correct channel frequency bandwidth. Typically, hospitality video systems reserve a block of channel frequency bandwidth that cannot be tuned by the customer for video-on-demand programs. As previously described, a customer uses the remote control unit 124 to select programming from a menu displayed on the TV 122. Upon receipt of signals from the remote control unit 124, via the TV 122, the room terminal 120 transmits commands to the systems control computer 118 requesting broadcast of the selected video-on-demand program. The systems control computer 118 transmits appropriate commands to the video server 114, including channel frequency bandwidth information. In addition, the systems control computer 118 transmits the commands to the room terminal 120 and the TV 122 instructing that the channel is tuned to the same channel frequency as that being transmitted by the video server 114. The channel frequency actually used is different than the one selected by the customer. In other words, the systems control computer 118 and the room terminal 120 cause the selected program to be received at a channel frequency bandwidth different than that apparently selected by the customer.

For example, assuming the customer has tuned the TV 122 to a frequency bandwidth represented by channel 15, the systems control computer 118 and the room terminal 120 will retune the TV 122 to a frequency bandwidth normally inaccessible by the customer (e.g., channel 28) unless a movie or other video-on-demand program is ordered. The customer is unaware of this activity. Other customers that tune to channel 15 will not receive the video-on-demand programming selected by the particular customer. In this manner, and because the process is controlled by the systems control computer 118 and the room terminal 120, unauthorized access to video-on-demand is blocked.

Figure 4:
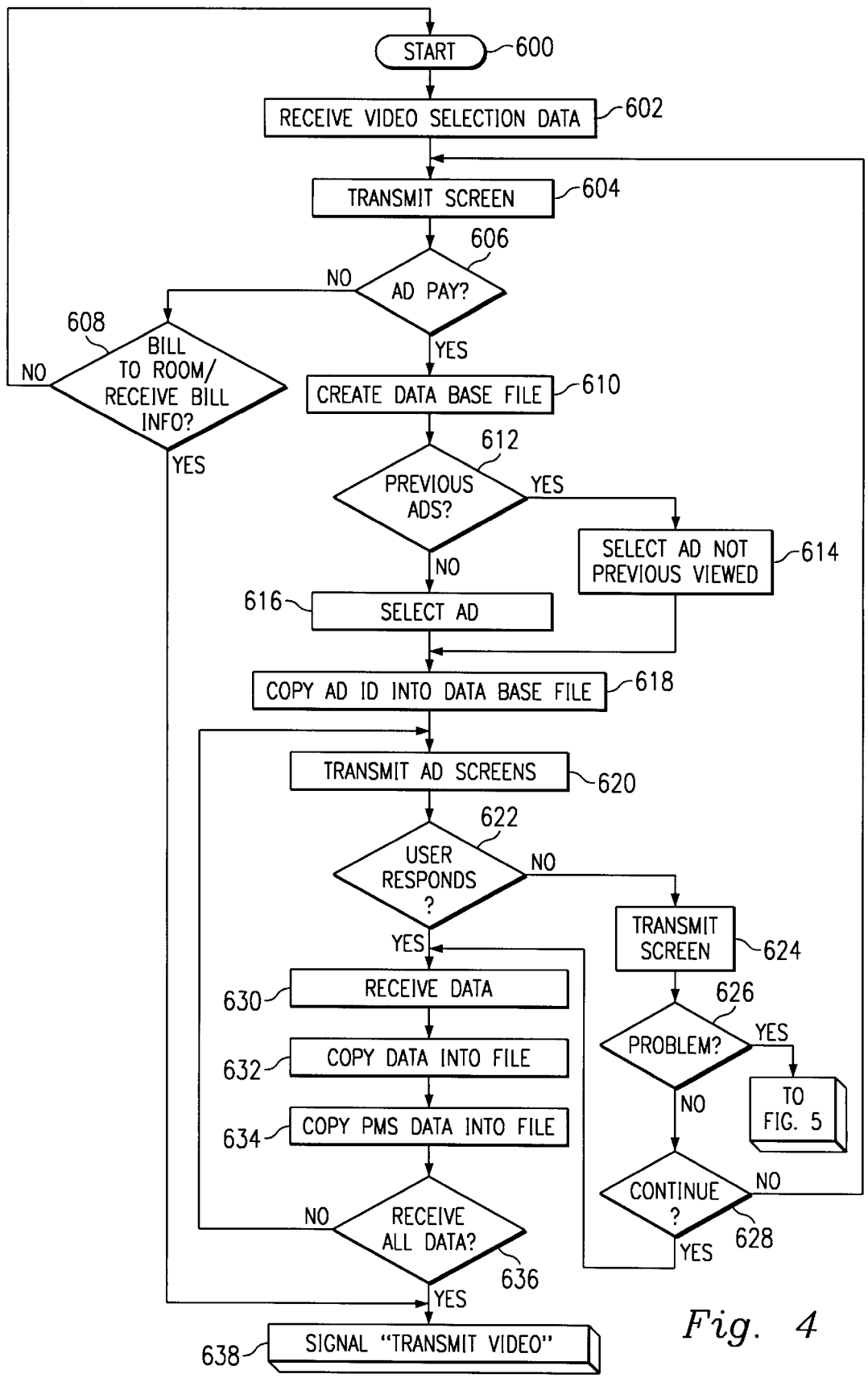
FIG. 4 is a flow chart illustrating control logic implemented by the systems control computer of FIG. 1 for providing interactive access to advertiser video-on-demand and pay-per-view services.

FIG. 4 is a flow chart illustrating the system 100 wherein a system user selects an advertiser video-on-demand and pay-per-view service offering. It is understood the functions described are implemented by instructions or logic executed by the systems control computer 118 alone or in conjunction with other components of the system 600. The flow chart assumes that the user already has selected a pay-per-view video program that he or she wishes to view.

Execution begins at step 600. At step 602 the systems control computer 118 receives data from a system user designating a pay per view program. The systems control computer 118 generates a graphic screen that is transmitted to the user's TV set after the user has selected a pay-per-view video program for viewing. The selection is temporarily stored in the computer memory. It should be noted that, in selecting a video program, the user has utilized several interactive graphic screens, describing how to use the system and listing by category the various movies stored within the video server 114.

In step 604, in response to receiving the video selection, the systems control computer 118 generates a graphic screen that is transmitted to the user's TV. The graphic screen asks the user if he or she wants to be billed for the movie or, instead, if they want to watch one or more advertisements and have the advertisers pay for the movie. In step 606, a determination is made whether the data entered by the user indicates that user has selected that the advertiser will pay. This determination is made based on a signal received from the user. For example, a number 1 entered with the remote control unit and transmitted to the computer 118 indicates that the user has selected not to use the "advertiser video-on-demand" and a "no" determination is made. Likewise, a number 9 entered with the remote control unit and transmitted to the computer 118 indicates that the user has selected to have the advertiser pay for the video and a "yes" determination is made. If no, in step 608, the system 600 receives and processes billing information or bills the transaction to the user's file within the property management system 210. This type of pay-per-view video and billing service is known in the art and will not be further described by FIG. 4. If yes, in step 610, the systems control computer 118 accesses the data base 212 and creates a new file for the transaction. It is advantageous for every advertiser video-on-demand or pay-per-view transaction to have a separate data base 212 file. In this manner, the advertiser sponsoring the video program can have access to data specific to their advertisements. Alternatively, a file can be established for an individual user and all data from various advertisements can be added to the same file. Another alternative is to have separate files for each advertisement and interactive data from all users is added to that one pre-existing file.

In step 612, a determination is made whether this particular user has previously used the advertiser video-on-demand service to pay for a video program. The systems control computer 118 makes this determination by searching the files already stored within the data base 212. This step is only necessary in the preferred embodiment wherein a different advertisement is transmitted to the user every time he or she selects the "advertiser video-on-demand" service. The data base 212 also can contain advertiser data that instructs the systems control computer 118 as to how many times a given advertiser will pay for a given consumer's video program by transmitting the same advertisement. Although not shown in this flow chart, the computer 118 would also use this data when determining which advertisement to transmit to the user's TV. If an advertisement is randomly selected, the flow chart skips to step 616. If the advertisement is preselected to be used in conjunction with a particular movie, the flowchart skips to step 620. In the preferred embodiment, if the determination is yes, in step 614, the systems control computer 118 selects an advertisement that is different than the other advertisements previously viewed by the user. If no, in step 616, the systems control computer 118 selects an advertisement based on a predetermined criteria. For example, the advertisement can be randomly selected or can be selected based on the type of movie chosen—Jeep advertisements for adventure movies, etc. A separate data base 212 file can keep record of all the video services, utilized by a particular user, in order to determine trends, e.g., the user has viewed four adventure video programs. Advertisement selection then can be based on the accumulative preference of the user. Other criteria for advertisement selection, such as product purchasing preference data that is stored in the PMS 210 or some other data base, also can be utilized.

In step 618, an identification code for the advertisement is copied into the data base 212 file. In step 620, the systems control computer 118 transmits a command to the storage unit for the advertisement instructing the unit to begin transmitting the advertisement to the appropriate TV on a designated frequency channel. The systems control computer 118 also transmits a signal to the appropriate room unit commanding it to receive the advertisement on the same designated frequency channel. The advertisement can be stored in the video server 114, the systems control computer 118 or processors, such as the graphic engines 214, that are adjunct to the computer 118. In an alternative embodiment, the advertisement can be part of the same file as the selected video programming. Two versions of the video programming would be stored in the video server 114, one with advertisements and one without. At this stage in the flow chart, the systems control computer 118 would signal the video server 114 to begin transmitting the movie with the advertisements. This embodiment clearly does not have the flexibility or the interactive capability of the preferred embodiment. If the advertisement is not interactive, the flowchart skips to step 63? after the advertisement is completed.

In step 622, a determination is made whether the user is transmitting interactive signals in response to the advertisement. If no, the systems control computer 118 transmits a screen to the user's room TV requesting input from the user as to whether he or she wishes to continue with the interactive advertisement or opt to pay for the film. The same screen can request input from the user as to whether he or she needs help for a service representative to complete the interactive advertisement. In step 626, a determination is made whether the user's input indicates that the user is having trouble with the interactive advertisement and wishes to be helped with a telephone call from a live service representative. Absence of input can also indicate that the user is having trouble responding to the interactive advertisement. In any case, the execution continues with the flowchart in FIG. 5. This step is particularly useful if the interactive advertisement is going to be used to purchase a service or product. This step also can be omitted. Alternatively, a screen can be transmitted to the TV that suggests that the user call the establishment's front desk and ask for assistance or the execution can proceed with step 604, thus giving the user the opportunity to pay for the programming rather than respond to an interactive advertisement.

In step 628, a determination is made whether the user's input indicates that the user wishes to continue with the interactive advertisement. If no, execution proceeds back to step 604, thus giving the user the opportunity to pay for the programming rather than respond to an interactive advertisement. If yes, the user inputs data and execution proceeds. In step 630, the systems control computer 118 receives data input from the user. This can be data input in response to a single question or to a plurality of questions. In step 632, the systems control computer 118 copies the data into the data base 212 file. In step 634, the computer 118 queries and receives information concerning the user from the PMS 210. This information can include the registered user's name, address, and home telephone number. This information also is copied into the data base 212 file.

In step 636, a determination is made whether the user has input data in response to all the interactive questions. If no, execution proceeds back to step 620 and screens that have not received a response are re-transmitted. Execution then would proceed from step 620 as described above. If yes, execution proceeds to step 638. In step 638, the computer 118 transmits a signal to the video server 114 commanding the video server to begin transmitting the requested video program to the appropriate room TV.

Figure 5:
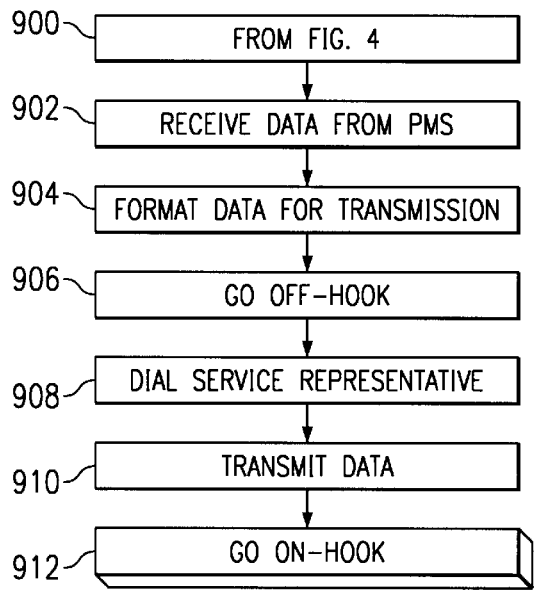
FIG. 5 is a flow chart illustrating control logic implemented by the systems control compute of FIG. 1 for redirecting the transaction to a customer assistance representative.

FIG. 5 is a flow chart illustrating the system's capability of contacting a live service representative. As described herein, this application is useful in instances when the system user does not understand how interact with the advertisements or in instances when the equipment (e.g., the remote control unit) or interactive software are functioning incorrectly. It may not be cost-effective to implement this feature with every system. However, if the interactive advertisements are used to complete sale transactions, this application will keep advertisers from losing sales because of technical problems or confused customers. As with FIG. 4, it is understood the functions described are implemented by instructions or logic executed by the systems control computer 118 alone or in conjunction with other components of the system 600.

Execution continues at step 900 from FIG. 4. At step 902, the system control computer 118 queries the PMS 210 to determine the user's name and the room telephone number. In step 904, the data from the PMS 210 is formatted for transmission on a telecommunications network. In addition, the data received from the system user and stored in the data base 212 can also be retrieved and formatted for transmission.

At step 906, a modem for the systems control computer 118 goes off hook and receives a dial tone signal. Typically, the modem is a 9600 baud modem or an 14,400 baud modem connectable to the public switched telecommunications network. The dial tone signal is received from the local telephone company's central office switch if the modem is connected to the public switched network; otherwise, the dial tone signal is received from the hospitality establishment's private branch exchange (PBX). In step 908, the modem dials the number of the service representative. Typically, the service representative is a service representative center comprised of a plurality of service representatives, each with a telephone and computer work station. Alternatively, the service representative can be an employee of the hospitality establishment, in attendance at the front desk or at a business or administrative office. At step 910, the data that has been formatted is transmitted via the modem to the service representative. In a preferred embodiment, the data is formatted according to protocols that allow it to be written onto the screen of the service representative's work station. It an alternative embodiment, instead of a data modem, the systems control computer utilizes voice processing boards and a digitized voice format to transmit voice information to the service representative. At step 912, after transmitting the data and receiving a protocol signal assuring that the data has been received, the modem goes on hook and the telephone call is terminated. It should be understood that, after receiving the transmitted data, the service representative will utilize the data to call the system user and offer help with the system. In an alternative embodiment, the modem continues to stay off hook and the connection between the systems control computer 118 and the service representative stays active so that the representative can transmit additional signals or commands to the computer 118. For example, the service representative can transmit a command to the system control computer 118 requesting that the computer 118 signal the video server 114 to begin transmitting the system user's selected video programming.

Figure 6:
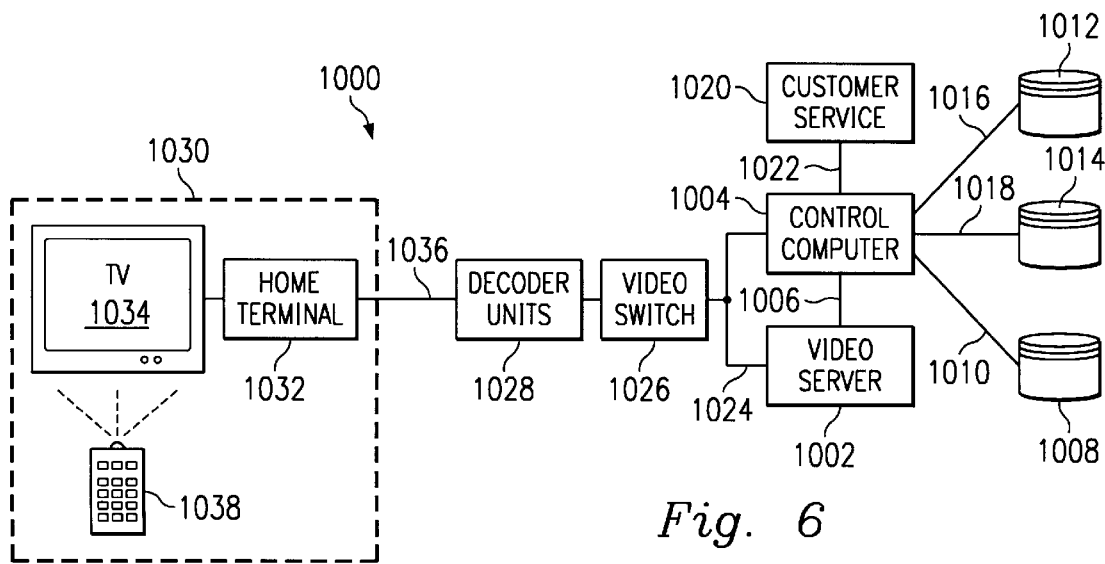
FIG. 6 is a functional block diagram of a video services system within a cable television network or a video dial tone telecommunications network.

FIG. 6 is a block diagram illustrating a system 1000 for residential video-on-demand video services implemented within a public video network. With system 1000, the interactive services and advertisements as described above can be provided to residential users of pay-per-view video services. The system 1000 can be implemented both within a cable television network and in a telecommunications video dial tone network; however, a telecommunications network implementation is illustrated in FIG. 6.

A video server 1002 is utilized to store and transmit digitized video programming, typically in an MPEG format. The video server executes the same functions as the video server 114. Because the server 1002 will serve a much larger population base, and because the users are not transient as with the hospitality market, the video server 1002 is capable of storing a large library of video programming. Accordingly, the video server 1002 must contain sufficient memory to store the large amount of data. In the preferred embodiment, the video server 1002 is an IBM ES9000 or a Hewlett-Packard MediaStream server Mainframe computer or a comparable computer.

The video server 1002 and the control computer 1004 are connected by data link 1006. The control computer 1004 executes the same functionality as the systems control computer 118. It may be preferable to divide the functionality of the control computer 1004 into two or more separate units. To aid in processing large numbers of system queries, functionality such as routing and communications can be retained and the functionality required to interface with data bases and the video and graphic capability would be moved to a separate processor or to a video server 1002. It is also possible to add an additional switch that is umbilically tied to the control computer 2004 that would execute the routing functionality. In addition, for the preferred embodiment, the control computer 1004 utilizes an external data storage device/data base 1008 for storing billing information and other user data. By using an external data base 1008, the memory within the control computer 1004 can be more efficiently utilized to control system and service operation. As an alternative embodiment, this data can be stored in memory within the control computer 1004. Ultimately, the configuration utilized for the control computer 1004 will depend on the size of the community being served by the system 1000. Computers such as the Hewlett Packard 9000 series computer can be utilized to execute the functionality of the control computer 2004.

Advertisements for the advertiser video-on-demand and pay-per-view services can be stored in several different locations. It is preferred that the advertisements are stored as separate files within the video server 1002. As an alternative, some advertisements can be stored within the memory of the control computer 1004. However, it is likely that the control computer 1004 will not have sufficient memory to store the large number and variety of advertisements preferred for the present embodiment. As described with the system 600, advertisement data also can be stored in separate adjunct units, similar to the graphics engines 214, but with more memory capacity.

The control computer 1004 is connected to data base 1008 via data link 1010. Data base 1008 can represent a plurality of data bases resident in one or more computer processors. The data base 1008 executes the same functionality as the data base 212 described in FIGS. 2 and 4. It is preferred that, in this embodiment, the data base 1008 resides in a processor separate from the control computer 1004 and that the data base 1008 is accessible to numerous control computers 1004 and systems 1000 and 100. It is also possible that some of the data bases within data base 1008 could reside in the control computer 1008 or an adjunct processor (not shown) and other data bases 1008 and functionality reside in a remote processor.

The control computer 1004 can be connected to a plurality of data bases represented in FIG. 6 by data bases 1012 and 1014. Data bases 1012 and 1014 are data bases primarily for credit, debit, and bank cards, including VISA and Master-Card bank cards, American Express and department store credit cards. These data bases contain records of purchases made by the video system users. The control computer 1004 is connected to the data bases 1012 and 1014 by links 1016 and 1018. In a preferred embodiment, links 1016 and 1018 are dedicated high speed data links. However, these links can also be standard telephone network data trunks. The control computer 1004 uses the information received from data bases 1012 and 1014 to determine which advertisements to select to be transmitted to the system user. For example, if after querying data bases 1012 and 1014 a determination is made that the system user uses his or her bank cards to purchase tickets to sporting events and alcoholic beverages. The control computer 1004 also queries data base 1008 in order to determine what movies and advertisements the user has viewed in the past. Based on is internal software logic, the control computer 1004 then selects an advertisement for an alcoholic beverage or for an automobile, or some other product, that appeals to people with similar interests and tastes and promote products the advertisers believe the user will purchase. As with the system 600, the advertisements can be interactive.

The control computer 1004 is connected to data base 1008 via data link 1010. Data base 1008 can represent a plurality of data bases resident in one or more computer processors. The data base 1008 executes the same functionality as the data base 212 described in FIGS. 2 and 4. It is preferred that, in this embodiment, the data base 1008 resides in a processor separate from the control 1004 and that the data base 1008 is accessible to numerous control computers 1004 and systems 1000 and 100. It is also possible that some of the data bases within data base 1008 could reside in the control computer 1008 or an adjunct processor (not shown) and other data bases 1008 and functionality reside in a remote processor.

The control computer 1004 also can be connected to service representative 1020. Service representative 1020 can be individual representatives utilizing telephones to interface with the control computer 1004 or can be a center equipped with computer work stations (not shown) as known by those familiar with the art. As with the system described above, the control computer 1004 has the capability to seize a telecommunications link 1022 and outdial to service representative 1020. Once a connection is established with the service representative 1020 work station, all the pertinent data gathered by the control computer 1004 is copied and transmitted to the work station via telecommunications link 1022 and displayed on the work station screen.

In a preferred embodiment, the transmission link 1024 is a fiber optic trunk capable of transporting broadband signals. Transmission link 1024 also can be other types of telecommunications broadband transmission means. Although not shown, transmission link 1024 can pass through several regional and local switching offices (not shown) before connection to the end central office serving the user (also called an "end office," not shown) ordering the pay-per-view video programming. Typically the transmission link 1024 is connected to a video switch 1026 that resides in the end office. However, it is not necessary for the switch 1026 to reside in an end office. It may reside an a switch office that serves several end offices or it may reside in a virtual central office, utilized only for the video switch 1026. Other network placements for the video switch also are possible. Numerous types of switches currently and in the future will serve as a video switch 1026. For example, digital video cross connect switches are being utilized by several telephone companies as video switches for video dial tone trials. However, the preferred switch for the system 1000 is an Asynchronous Transfer Mode (ATM) switch. An ATM switch is a packet-based, broadband switch that facilitates concentration, multiplexing, and de-multiplexing of channels of data transmitted at different speeds. Individual 53 byte packets of data are used to transport the digitized audio and video data. Each packet contains 48 bytes of "pay load" data and a five byte header. The header contains the identification and transmission information. Packets are transmitted in bursts along a "virtual" channel to the destination. Each packet contains approximately five seconds of video content.

The MPEG decode units 1028 function in a manner consistent with the MPEG decoder circuit boards described in FIG. 2 as being internal to the video server 114. With system 1000, it is no longer desirable to locate the MPEG decoder units 1028 at or within the video server 1002. If so located, video data would be decoded at the video server 1002 and inefficiently transmitted as "real time" video through the network, thus squandering the capacity of network facilities. As an alternative, the decoder units 1028 can be placed between the video switch 1026 and the residence 1030. Additionally, when the technology is available, the decoder functionality can be included within the home terminal 1032 or the TV 1034. Currently, television sets do not include MPEG decoder capability, and the technology can be more cost effectively located within the network, between the residence 1030 and the video switch 1026 than at the home terminal 1032.

Transmission link 1036 is representative of the local transmission loop between the CO 1022 and the residence 1030. Preferably, the link 1036 is a fiber optic line capable of transmitting broadband signals. As an alternative, the link 1036 can comprise a fiber optic link that terminates at a neighborhood point of termination such as an Optical Network Unit, and then comprise coaxial cable from the point of termination to each residence 1030 served by that particular unit. Other local loop architectures and transmission means can also be utilized. For example, it is known in the art that standard twisted pair copper transmission lines can be upgraded by a technology known as Asymmetrical Digital Subscriber Line so that it can transmit compressed broadband transmissions. It should be noted that, in both telecommunications video dial tone networks and cable television networks, the transmission link 1036 must allow "up-stream" data transmissions, i.e., data input by the user, using remote control 1038, is transmitted via link 1036 to the video switch 1026 and then via the link 1024 to the control computer 1004 and the video server 1002. It is known by those familiar with the art that the local transmission loop architectures described above provide the capability and sufficient bandwidth for up-stream data transmissions.

Residence 1030 is representative of a plurality of residences served by the same video server 1002. Typically, three thousand or more residences can be served by a single video server 1002. A home terminal 1032, a TV 1034, and a remote control unit 1038 are located within the residence. The home terminal 1032 executes the same functions as the room terminal 120, described in detail in FIG. 3. In a preferred embodiment, the home terminal 1032 is incorporated into the TV 1034 or into a cable television box (not shown). The home terminal 1032 also can be embodied in a separate unit that is adjunct to the TV 1034 and the cable television box. The TV 1034 is a standard television set currently available in the market place. In addition, the TV 1034 can be an enhanced television set with a home terminal 1032 and/or a decoder unit 1026 built into its circuitry. Also, in the future, it is highly probable that the TV 1034 will be high definition television (HDTV). It should be noted that television sets with built in room terminal 120 circuitry already are available in the marketplace. The remote control unit 1038 is a standard remote control unit such as those currently available in the marketplace.

It is understood that variations may be made in the present invention without departing from the spirit and scope of the invention. For example, with the preferred embodiment, each hospitality establishment would contain a plurality of IRDs 112, a systems control computer 118 and a video server 114. As an alternate embodiment, elements of the present invention could be centrally located and utilized to provide pay-per-view and video-on-demand services for a plurality of properties. In another alternative embodiment, the functionality of the systems control computer 118 and the video server 114 can be combined into one computer. Alternatively, one video server 114 or 1002 can be accessible to more than one systems control computer 118 and control computer 1004. In this manner, a single video server 114 or 1002 serves numerous systems 100 and 1000. In yet another embodiment of the invention, the data that is to be used for the "real-time" video broadcasts first would be transmitted to the video server 114 and then decoded and decompressed by the video server 114, at the command of the systems control computer 118, for transmission to the customers' room TVs.

Although illustrative embodiments of the present invention have been shown and described, a latitude of modification, change and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. A method for interactive presentation of video programming choices and payment options on a television, the method comprising:

storing a plurality of video programs for presentation on said television, said video programs being accessed for said presentation via a video server;

offering a menu of said video program choices on said television;

offering a menu of said payment options for said video programs on said television, wherein one of said payment options comprises viewing by the viewer of an advertisement program in lieu of direct payment by the viewer;

accessing a control computer, said control computer accessing a data base and using data stored in said data base to select an advertisement program to be presented to the viewer;

confirming validity of a selected one of said payment options for said selected video program;

authorizing presentation of said selected video program upon said confirmation;

presenting said selected video program on said television upon said authorization.

2. The method of claim 1 wherein said payment options include participation by the viewer in an interactive advertisement program in lieu of direct payment by the viewer.

3. The method of claim 1 wherein said payment options include payment using a debit or credit card.

4. The method of claim 1 wherein a property management system is operatively connected to said control computer and said payment options include billing to a folio account.

5. The method of claim 2 wherein said interactive advertisement program comprises viewer entry of data to said control computer responsive to questions or choice options as presented on said television.

6. The method of claim 5 further comprising a remote facility operatively connected to said control computer for receiving said data.

7. The method of claim 2 wherein said control computer is operatively connected to a remote customer service facility for transferring information related to said advertising program to said viewer.

8. The method of claim 1 wherein said control computer determines said advertisement selection based on said data related to the viewer's past purchasing history.

9. The method of claim 2 wherein said control computer determines selection of said advertisement based on interactive selection of video programming by said viewer.

10. Apparatus for interactive presentation of video programming choices and payment options on a television, the apparatus comprising:

a data storage means for storing a plurality of video programs for presentation on said television;

a video server for accessing said video programs from said data storage means for presentation on said television;

a data base for storing data indicative of a viewing and purchasing history of said viewer;

a control computer connected to said video server for:

offering a menu of said video program choices on said television;

offering a menu of said payment options for said video programs on said television, wherein one of said payment options comprises selection of an advertisement program to be viewed in lieu of direct payment by the viewer;

confirming validity of a selected one of said payment options for a selected one of said video programs;

connecting to said data base;

using data stored in said data base to select an advertisement program to be viewed by the viewer in lieu of direct payment by the viewer;

authorizing presentation of said selected video program upon said confirmation;

instructing said video server to present said selected video program on said television upon said authorization.

11. The apparatus of claim 10 wherein said advertisement program includes participation by the viewer in an interactive advertisement program in lieu of direct payment by the viewer.

12. The apparatus of claim 10 wherein said payment options include payment using a debit or credit card.

13. The apparatus of claim 10 wherein a property management system is operatively connected to said control computer and said payment options include billing to a folio account.

14. The apparatus of claim 11 wherein said interactive advertisement program comprises viewer entry of data to said control computer responsive to questions or choice options as presented on said television.

15. The apparatus of claim 14 further comprising a remote facility operatively connected to said control computer for receiving said data.

16. The apparatus of claim 11 wherein said control computer is operatively connected to a remote customer service facility for transferring information related to said advertising program to said viewer.

17. The apparatus of claim 10 wherein said data stored in said data base is indicative of a purchasing and video program viewing history of said viewer.

18. The apparatus of claim 11 wherein said control computer selects said advertisement program to be presented to said viewer based on interactive selection of video programming by said viewer.

19. The method of claim 1 wherein said control computer selects said advertisement program to be presented to the viewer based on the content of said video program selected by the viewer.

20. The method of claim 1 wherein said control computer selects said advertisement program to be presented to the viewer based on data stored in said databases indicating a video program viewing and purchasing history of the viewer.

\* \* \* \* \*